INVENTOR.
CHARLES E. MAYNARD
BY
*William P. Hickey*
ATTORNEY

Aug. 28, 1962 C. E. MAYNARD 3,050,945
PRESSURE INTENSIFYING UNIT
Filed July 17, 1961 2 Sheets-Sheet 2

INVENTOR.
CHARLES E. MAYNARD
BY
William P. Hickey
ATTORNEY

# United States Patent Office 3,050,945
Patented Aug. 28, 1962

3,050,945
PRESSURE INTENSIFYING UNIT
Charles E. Maynard, South Bend, Ind., assignor to The Bendix Corporation, South Bend, Ind., a corporation of Delaware
Filed July 17, 1961, Ser. No. 124,556
6 Claims. (Cl. 60—54.6)

The present invention relates to power braking systems and the like of the type wherein pressure from a master cylinder is intensified in a servomotor driven fluid pressure intensifying unit which communicates the master cylinder directly to the vehicle's brake applying motors when the intensifying unit is in its normal unactuated condition so that any deficiency of fluid in the output of the intensifying unit will be made up by means of fluid from the master cylinder.

One system of the general type with which we are concerned is shown in the Robert R. Hager application 71,472 filed November 25, 1960. In the system shown in the Hager application, fluid pressure from the master cylinder A is continually communicated to the hydraulically operated control valve of the servomotor D, and causes the servomotor D to be actuated upon receiving a pressure signal from the master cylinder. The servomotor D operates a hydraulic piston in its fluid pressure intensifying cylinder B which in turn discharges pressure to the brake C of the vehicle in which it is mounted. In the system shown in the Hager application, fluid pressure from the master cylinder is also communicated to the follow-up side of the intensifying unit's hydraulic piston from which the fluid is in turn communicated to the brake structure C by a compensating passage having a check valve therein which is only open when the hydraulic piston is in its normal retracted position. The Hager application further provides valve means which prevents flow from the master cylinder A to the follow-up chamber of the unit B until its control valve structure E is operated to actuate the servomotor D. The means taught by the Hager application is positive in its action and completely closes off the master cylinder from the follow-up chamber to prevent compensation when the system is not being actuated; so that it is necessary to provide an additional compensation connection on the output side of the fluid pressure intensifying cylinder B.

An object of the present invention is the provision of a new and improved system of the general type taught by the Hager application but in which the second compensating connection on the discharge side of the hydraulic piston of the fluid pressure intensifying unit B can be eliminated.

A further object of the present invention is the provision of a new and improved system of the above described type wherein a valve of large capacity is used for closing off flow between the master cylinder and the follow-up chamber of the fluid pressure intensifying unit—which valve is closed whenever its servomotor is power actuated; and in which there is further included a by-pass connection around this valve which will permit very small flows at substantially no differential pressure to normally permit compensation of the follow-up chamber from the master cylinder A, but which will be closed off when subjected to large differentials in pressure.

A still further object of the present invention is the provision of a new and improved system of the above described type wherein the above referred to by-pass connection is formed by means of a generally horizontally extending valve chamber having opposite end ports which are adapted to be closed off by means of a spherical ball member having predetermined clearance with respect to the sidewalls of the valve chamber, and which ball is lifted into engagement with the valve seat by predetermined fluid flows past the ball.

The invention resides in certain constructions and combinations and arrangements of parts; and further objects and advantages of the invention will become apparent to those skilled in the art to which it relates from the following description of the preferred embodiment described with reference to the accompanying drawings forming a part of this specification, and in which.

Figure 1:
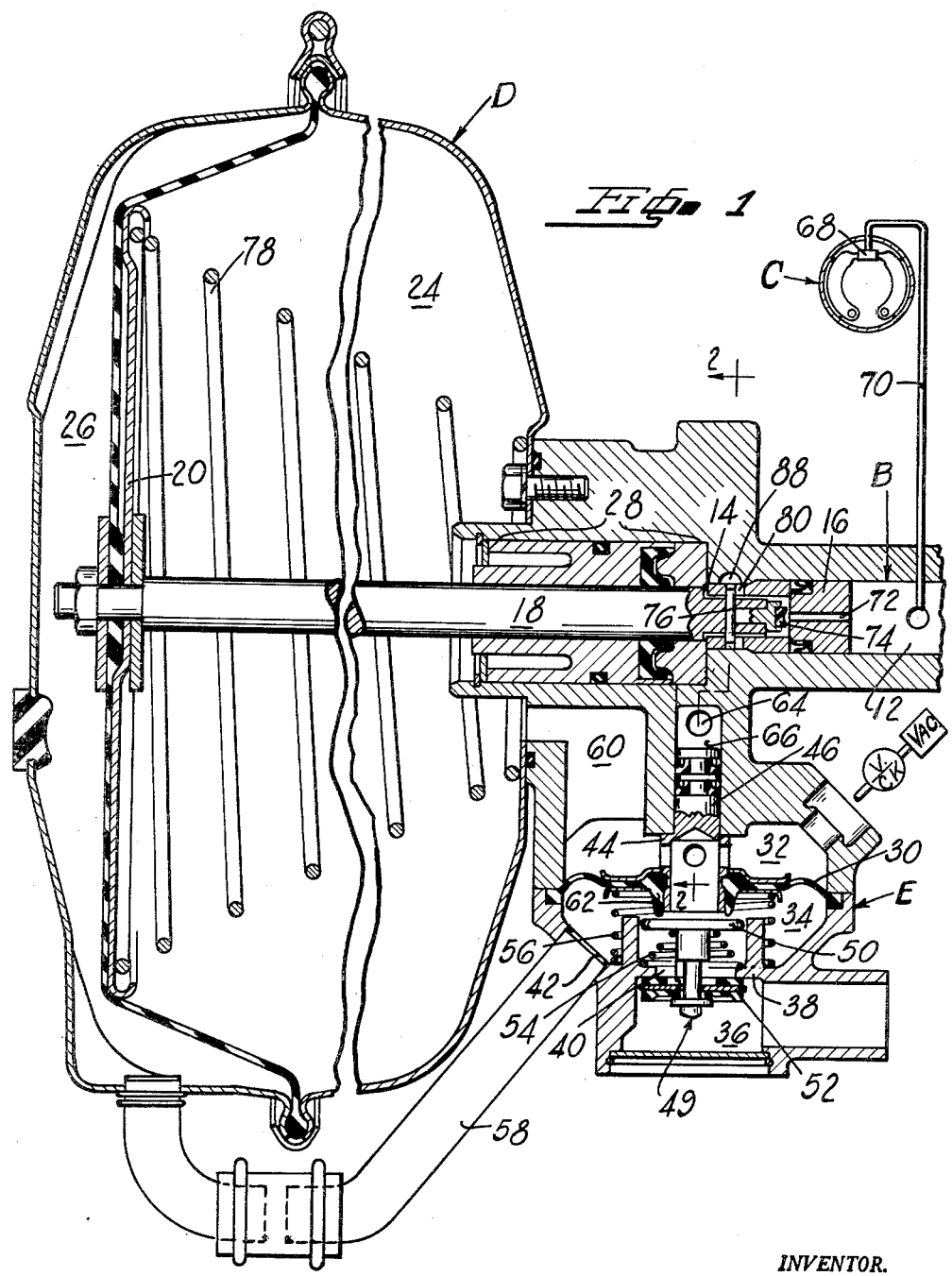
FIGURE 1 is a longitudinal cross sectional view of a servomotor driven fluid pressure intensifying unit embodying principles of the present invention, and in which connecting portions of an automotive braking system are shown schematically.
Figure 2:
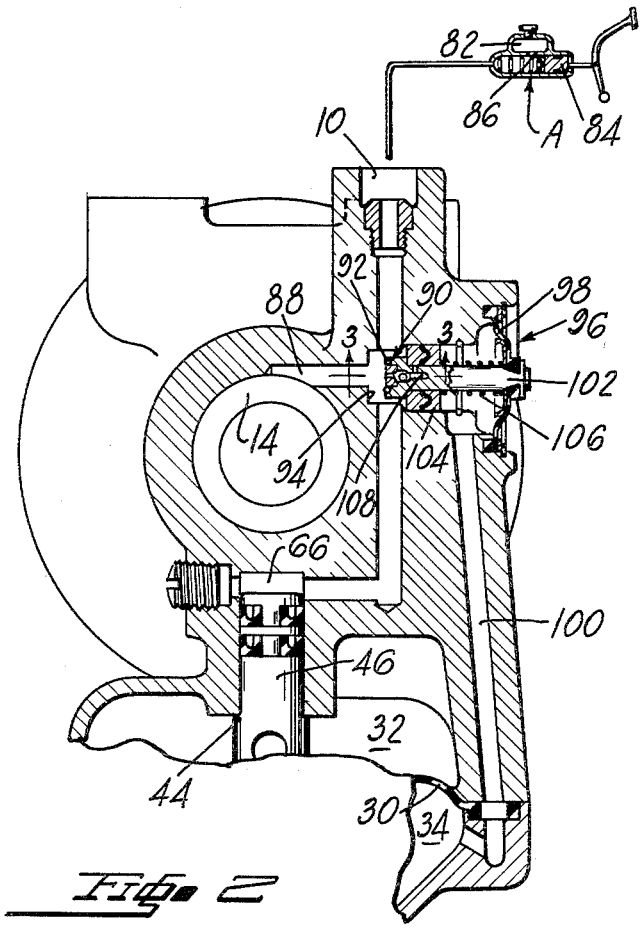
FIGURE 2 is a fragmentary cross sectional view taken approximately on the line 2—2 of FIGURE 1, the figure also having portions of an automotive hydraulic braking system shown schematically.

The fluid pressure intensifying unit shown in the drawing has a hydraulic pressure inlet 10 to which is communicated the pressure signal from a conventional master cylinder A, and the unit intensifies this signal in its hydraulic pressure intensifying chamber B. The hydraulic pressure intensifying chamber is divided into an output, or hydraulic pressurizing chamber 12 and a follow-up chamber 14 by means of a hydraulic piston 16. The hydraulic piston 16 is adapted to be driven down the intensifying chamber B by means of the piston rod 18—which in turn is driven by a power piston or diaphragm 20 of the servomotor D. The power diaphragm 20 divides the internal chamber of the servomotor into a forward power chamber 24 to which vacuum is always communicated as will later be explained, and a rear power chamber 26 to which vacuum is normally communicated and to which atmospheric pressure is modulated to actuate the unit. A suitable sealing structure 28 is provided around the piston rod 18 to seal off the end of the hydraulic pressure intensifying chamber; and for a more complete description of its construction reference may be had to the Maxwell L. Cripe application 109,595.

Control of the servomotor unit D is had by means of the control valve structure E which as previously indicated normally communicates vacuum to the rear power chamber 26, and which communicates atmospheric pressure thereto when it actuates the motor. The control valve E has a movable diaphragm 30 which separates the valve's vacuum chamber 32, to which vacuum is always communicated, from the valve's control chamber 34. The control valve E further contains an atmospheric chamber 36 spaced on the opposite side of the control chamber 34 from the diaphragm 30, and atmospheric chamber 36 is separated from the control chamber 34 by means of a rigid partition member 38. Aligned vacuum and atmospheric control ports 42 and 40 are provided in the diaphragm 30 and partition 38, respectively. The vacuum port 42 is formed by means of a tubular end portion 44 of the valve's hydraulic actuating piston 46. Suitable passageways are provided in the tubular end portion 44 to communicate vacuum from the chamber 32 to the control chamber 34. The atmospheric and vacuum ports 40 and 42 are adapted to be closed off by means of spool shaped poppet member 49 which extends through the atmospheric port 40 and has suitable flange portions for abutment with the outer surfaces of the partition member 38 and tubular end portion 44 of its hydraulic actuating piston 46. A spring 54 normally biases the flange 52 against the atmospheric valve seat surrounding the port 40 and a spring 56 normally biases the suitably stiffened center portion of the diaphragm 30 out of engagement with the flange 50 to communicate vacuum to the rear power chamber 26 through conduit 58. Vacuum from the chamber 32 is also continually communicated to the opposing power chamber 24 through passageway 60. The diaphragm 30 includes an annular boss 62 which surrounds the tubular portion 44 to make a vacuum tight seal with respect to the flange 50; and for a more complete understanding of the construction and operation of the control valve so far described, reference may be had to the Maxwell L. Cripe application 59,914.

Actuation of the control valve E is produced by means of the hydraulic signal which is received from the master cylinder A through the inlet 10 and which is communicated through passageway 64 to the valves hydraulic actuating chamber 66. Passageway 64 is always open so that the control valve E is made directly responsive to the pressure signal produced in the master cylinder A.

The output chamber 12 is of course connected to the brake actuating wheel cylinders 68, only one of which is shown, by means of the hydraulic actuating line 70; and because of overnight shrinkage of the volume of fluid in the wheel cylinders 68 and line 70, it is necessary to provide means for permitting additional hydraulic fluid to enter these lines in order to prevent a vacuum from being created which will suck air past the seals of the wheel cylinders into the system. As is conventional in intensifying units of the type shown in the drawing, the hydraulic piston 16 is provided with a compensating passage 72 which communicates the output chamber 12 with the follow-up chamber 14. The compensating passage 72 is closed off during actuation of the servomotor by a poppet member 74 attached to the end of the push rod 18. The push rod 18 is loosely pinned to the hydraulic piston 16 as by means of pin 76 which extends into a slotted opening to the piston 16 to provide for the necessary poppet movement. Once the diaphragm 20 is actuated, poppet 74 closes off the compensating port 72 and the push rod 18 thereafter forces the piston 16 down the chamber B. The push rod 18 is of course normally biased to its retracted position shown in the drawing by the power piston return spring 78; and in this position the outer end of the piston 16 abuts the inner end of the sealing structure 28 and the poppet 74 is held off of its seat. Rearward movement of the piston rod 18 is limited by the pin 76 abutting the rearward end of the slotted hole 80 in the piston 16. The conventional master cylinders A which are intended to be used in conjunction with the fluid pressure intensifying unit shown in the drawing are provided with a reservoir of make-up fluid 82 which is communicated to its outlet in the normal retracted position of its piston 84 by means of a compensating port 86. If no further control means is provided therefore, fluid communication is provided between the reservoir 82 and the wheel cylinders 68 in the normal retracted positions of the pistons 16 and 84.

In the fluid pressure intensifying unit shown in the drawing, the piston rod 18 is of quite large size so that the displacement of the follow-up chamber 14 is only a fraction of that of its output chamber 12. During normal operation, therefore, the master cylinder A need only provide a small fraction (generally less than half) of the displacement of the driven wheel cylinders 68. According to principles of the present invention it is desired to take advantage of this fact by sizing the master cylinder A to have a displacement only slightly exceeding that of the follow-up chamber 14; so that the foot pedal lever movements for actuating the master cylinder A can be correspondingly reduced. In order to be sure that this can safely be accomplished, however, it is necessary to provide means which prevents any appreciable amount of the displacement of the master cylinder A from being forced through the compensating passage 72 to the wheel cylinders 68 before the power unit D is actuated and its piston rod 18 moved inwardly to close off the compensating port 72. This is accomplished in the device shown in the drawing by means of a branch passageway 88 which communicates its inlet 10 with the follow-up chamber 14, and which is adapted to be closed off by means of a poppet member 90 whenever power is available to actuate the servomotor D.

Poppet member 90 has a molded rubber seal 92 on its end face for abutment with a valve seat or shoulder 94 which surrounds the branch passageway 88 to normally close off communication between the unit's inlet 10, and the follow-up chamber 14. Poppet 90 is normally biased against the seat 94 by means of a vacuum motor 96 comprising a diaphragm 98 to the inside of which control vacuum from the control chamber 34 of the motor's control valve E is normally communicated by means of the passageway 100. Diaphragm 98 is suitably affixed to the stem portion 102 of the poppet member 90 so that atmospheric pressure on the external side of the diaphragm 98 biases the poppet member 90 against the valve seat 94. Suitable sealing structure 104 is provided between the stem 102 and the housing of the unit, and a coil spring 106 is provided to lift the poppet member 90 from the valve seat 94 whenever atmospheric pressure is communicated to the inside of the diaphragm 98. The stem 102 has a diameter generally equal to the sealing area of seal 92 so that poppet member 90 is substantially completely hydraulically balanced. Under normal conditions, vacuum is always communicated to the control chamber 34 of the control valve E so that the poppet member 90 normally closes off communication between the master cylinder A and follow-up chamber 14 until the control valve E is actuated to bleed air pressure into the rear power chamber 26 of the servomotor D. Thereafter the control pressure against the inside of the diaphragm 98 plus the force of spring 106 lifts the poppet member 90 off of the valve seat 94 to communicate the master cylinder A with the follow-up chamber 14.

As above explained, poppet member 90 is normally in its closed position whenever a vacuum supply to the servomotor D exists. The vacuum supply system for the vacuum chamber 32 usually includes a check valve arrangement so that vacuum may be held inside of the diaphragm 98 for days to cause the poppet member 90 to be in its closed position and preventing compensation to the wheel cylinder 68 were no further compensating means provided.

Figure 3:
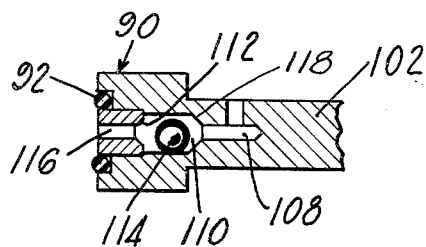
FIGURE 3 is an enlarged cross sectional view taken approximately on the line 3—3 of FIGURE 2.

According to further principles of the present invention, a small compensating passage 108 is provided around the poppet member 90 to provide for small compensating flows whenever valve 90 is in its closed position. The compensating passageway 108 may be provided in the housing member of the unit, but is more conveniently provided within the poppet member 90 itself. As best seen in FIGURE 3 of the drawings, compensating passageway 108 has a generally horizontally extending valve chamber 110 with an inwardly facing valve seat 112 adjacent its end which communicates with the branch passageway 88 leading to the follow-up chamber 14. A ball valve 114 is provided in the chamber 110 for closing off the valve seat 112. The ball valve 114 has a predetermined clearance with respect to the sidewalls of the valve chamber, and the valve seat 112 is generally centered with respect to the valve chamber 110 so that the ball 114 must be lifted into engagement with the valve seat 112 against the force of gravity. This permits small fluid flows to pass around the ball through its outlet 116 leading to the follow-up chamber 14 without valve closure. A sudden flow of fluid, however, develops sufficient differential pressure across the ball 114 to lift the ball 114 up into engagement with the valve seat 112 and thereafter prevent further flow from the master cylinder A to the follow-up chamber 14. In those instances where the master cylinder A is sized sufficiently large, a small flow of fluid through the compensating port 72 may be permitted when the unit is actuated, and in this case the ball valve 114 may not be necessary if the compensating passage 108 is made of a sufficiently small size to prevent large flows from passing therethrough.

In the preferred embodiment shown in the drawing, however, the ball valve 114 positively acts to close off these compensating flows so that substantially no loss of fluid through the compensating fluid 72 occurs during normal actuation of the unit. As previously mentioned, the center of the valve seat 112 is above the center of the ball 114 when the ball 114 is resting upon the sidewalls of its chamber 110. In the non-actuated condition of the unit, therefore, the ball valve 114 will fall off of the valve seat 112 to permit small flows of fluid therepast to compensate for volumetric changes due to thermal contraction of the fluid in the brake actuating wheel cylinders 68.

While it may not be necessary in all instances, the preferred embodiment further includes a valve seat 118 on the opposite end wall of the chamber 110 so that large return flows through the compensating passageway 108 causes the ball 114 to abut the valve seat 118 and limit these flows. Return flows from the follow-up chamber 14 thereafter lifts the poppet 90 off of the valve seat 94, so that a retarding action is provided which prevents inertia of these returning flows from sucking a vacuum in the wheel cylinders 68. Diaphragm 98 is suitably sized to provide the desired back pressure for these returning flows.

In normal operation of the system shown in the drawings, vacuum will be communicated to the control valve chambers 32 and 34, power chambers 24 and 26, and the inside of the diaphragm 98. Under these conditions, the compensating port 72 will be open, the poppet member 90 will abut its seat 94, and flow communication between the master cylinder A and the wheel cylinder 68 will be provided solely through small compensating passageway 108. When the master cylinder A is operated, initial flow from the master cylinder forces the ball 114 against the valve seat 112 so that thereafter all of the displacement from the master cylinder A flows to the piston 46 of the control valve D to move the annular boss 62 of the diaphragm 30 against the poppet 50 and thereafter lift the poppet 52 off of the atmospheric valve seat 38 to communicate air pressure to the rear opposing power chamber 26. Thereafter the power piston 20 moves to close off the compensating passageway 72 and cause the piston 16 to displace fluid out of the output chamber 12 to the wheel cylinder 68. Shortly after the piston rod 18 closes off the compensating port 72, the air pressure that is communicated to the control chamber 34 flows through the passageway 100 to the back side of the diaphragm 98, whereupon the spring 106 lifts the poppet member 90 off of its seat 94 to communicate the master cylinder A to the follow-up chamber 14. Thereafter the force that is applied to the piston 84 of the master cylinder A causes its displacement to flow into the follow-up chamber 14 to provide an indication of the amount of braking effort which is being produced. When it is desired to limit the amount of braking effort produced, movement of the brake lever of the master cylinder is stopped whereupon a slight additional amount of air flows to the rear opposing power chamber 26 to slightly increase the volume of the follow-up chamber 14 and suck fluid out of the valve's hydraulic actuating chamber 66 to permit it to return to the point wherein poppet 49 abuts the valve seat 38 while the diaphragm seal 62 still engages the poppet 49. This creates the "lap" condition of the valve wherein no further flow of air or vacuum occurs to the power chamber 26.

When it is desired to reduce the braking effort produced, the foot pedal lever is permitted to return to its fully retracted position whereupon the hydraulic pressure exerted upon the valve's hydraulic actuating piston 46 is reduced to a point where the diaphragm seal 62 moves out of engagement with the poppet 49 to draw air out of the rear opposing power chamber 26. The resulting decrease in pressure differential across the diaphragm 20 allows the pressure in the output chamber 12 to force the piston 16 rearwardly and thereby force fluid out of follow-up chamber 14 to the master cylinder A. Shortly after the diaphragm sealing portion 62 moves out of engagement with the poppet 49 to decrease the pressure in the rear opposing power chamber 26, vacuum is also communicated to the back side of the diaphragm 98 to force the poppet 90 against the valve seat 94 and provide a restriction for the return flow out of the follow-up chamber 14. This return flow causes the ball 114 to abut the valve seat 118 so that all of the return flow from the follow-up chamber to the master cylinder must flow past the poppet member 90 against the force that is established by reason of the diaphragm 98. This retards the return flow sufficiently so that inertia will not suck a vacuum in the wheel cylinders 68.

After a sufficient reduction in brake applying effort has been produced, retraction of the master cylinder's brake applying lever is stopped; whereupon vacuum continues to flow to the opposing power chamber 26 until displacement from the follow-up chamber 14 biases the valve actuating piston 46 outwardly to cause the sealing portion 62 of the diaphragm 30 to abut the poppet member 49. When it is desired to completely de-energize the braking system, all force upon the brake pedal lever is reduced; whereupon the master cylinder compensating port 86 is opened to permit all pressure to be eliminated from the valve actuating piston 46. The diaphragm sealing portion 62 thereafter remains out of engagement with the poppet 49, the piston 16 is caused to abut the end of the sealing structure 28, and the power piston return spring 78 thereafter pulls the poppet member 74 at the end of the piston rod 18 free and clear of its compensating port 72. At this time full vacuum is also communicated to the inside of the diaphragm 98 to hold the poppet member 90 against the valve seat 94 and thereby retard the return flow from the output chamber 12. After all return flow has ceased and the hydraulic pressures throughout the system have equalized, the ball 114 will fall off of its seat 118 to permit free communication for small compensating flows from the master cylinder's reservoir through its compensating port 86 and compensating connection 72 in the hydraulic piston 16 to the wheel cylinders 68.

While the invention has been described in considerable detail, I do not wish to be limited to the particular construction shown and described, it is my intention to cover hereby all novel adaptations, modifications and arrangements thereof which come within the practice of those skilled in the art to which the invention relates.

I claim:

1. Fluid pressure intensifying means having an inlet for receiving and intensifying a primary pulsating fluid pressure signal and comprising: a fluid pressure intensifying chamber having a movable wall therein dividing said fluid pressure intensifying chamber into an output chamber and a follow-up chamber, said movable wall having a normal position in said intensifying chamber; compensating means communicating said follow-up chamber to said output chamber and including check valve means for preventing flow from said output chamber to said follow-up chamber, said check valve means being open when said movable wall is in its normal position, a servomotor for moving said movable wall from said normal position to enlarge said follow-up chamber and force fluid out of said output chamber; control means for communicating a power supply to actuate said servomotor; expansible means driven by said primary fluid pressure signal for actuating said control means of said servomotor; valve means for controlling communication between said inlet and said follow-up chamber, motor means actuated by said power supply to said control means and biasing said valve means closed when power is supplied to said control means, and flow control means in parallel flow relationship with said valve means, said flow control means including a structure which prevents large fluid flow from said inlet to said follow-up chamber but which permits slow compensating fluid flow therethrough at substantially no differential in pressure.

2. Fluid pressure intensifying means having an inlet for receiving and intensifying a primary pulsating fluid pressure signal and comprising: a fluid pressure intensifying chamber having a movable wall therein dividing said fluid pressure intensifying chamber into an output chamber and a follow-up chamber, said movable wall having a normal position in said intensifying chamber; compensating means communicating said follow-up chamber to said output chamber and including check valve means for preventing flow from said output chamber to said follow-up chamber, said check valve means being open when said movable wall is in its normal position, a servomotor for moving said movable wall from said normal position to enlarge said follow-up chamber and force fluid out of said output chamber; control means for communicating a power supply to actuate said servomotor; expansible means driven by said primary fluid pressure signal for actuating said control means of said servomotor; valve means for controlling communication between said inlet and said follow-up chamber, motor means actuated by said power supply to said control means and biasing said valve means closed when power is supplied to said control means, and flow control means in parallel flow relationship with said valve means, said flow control means including a normally open check valve which is closed by a predetermined fluid flow from said inlet to said follow-up chamber.

3. Fluid pressure intensifying means having an inlet for receiving and intensifying a primary pulsating fluid pressure signal and comprising: a fluid pressure intensifying chamber having a movable wall therein dividing said fluid pressure intensifying chamber into an output chamber and a follow-up chamber, said movable wall having a normal position in said intensifying chamber; compensating means communicating said follow-up chamber to said output chamber and including check valve means for preventing flow from said output chamber to said follow-up chamber, said check valve means being open when said movable wall is in its normal position, a servomotor for moving said movable wall from said normal position to enlarge said follow-up chamber and force fluid out of said output chamber, control means for communicating a power supply to actuate said servomotor; expansible means driven by said primary fluid pressure signal for actuating said control means of said servomotor; valve means for controlling communication between said inlet and said follow-up chamber, motor means actuated by said power supply to said control means and biasing said valve means closed when power is supplied to said control means, and flow control means in parallel flow relationship with said valve means, said flow control means including a normally open check valve which is closed by a predetermined fluid flow in either direction between said inlet and said follow-up chamber.

4. Fluid pressure intensifying means having an inlet for receiving and intensifying a primary pulsating fluid pressure signal and comprising: a fluid pressure intensifying chamber having a movable wall therein dividing said fluid pressure intensifying chamber into an output chamber and a follow-up chamber, said movable wall having a normal position in said intensifying chamber; compensating means communicating said follow-up chamber to said output chamber and including check valve means for preventing flow from said output chamber to said follow-up chamber, said check valve means being open when said movable wall is in its normal position, a servomotor for moving said movable wall from said normal position to enlarge said follow-up chamber and force fluid out of said output chamber; control means for communicating a power supply to actuate said servomotor; expansible means driven by said primary fluid pressure signal for actuating said control means of said servomotor; valve means for controlling communication between said inlet and said follow-up chamber, motor means actuated by said power supply to said control means and biasing said valve means closed when power is supplied to said control means, flow control means in parallel flow relationship with said valve means, said flow control means including a horizontal valve chamber with inlet and outlet ports in its opposite end walls, which ports are surrounded by valve seats, and a loosely fitting ball valve in said chamber for closing said ports.

5. Fluid pressure intensifying means having an inlet for receiving and intensifying a primary pulsating fluid pressure signal and comprising: a fluid pressure intensifying chamber having a movable wall therein dividing said fluid pressure intensifying chamber into an output chamber and a follow-up chamber, said movable wall having a normal position in said intensifying chamber; compensating means communicating said follow-up chamber to said output chamber and including check valve means for preventing flow from said output chamber to said follow-up chamber, said check valve means being open when said movable wall is in its normal position, a servomotor for moving said movable wall from said normal position to enlarge said follow-up chamber and force fluid out of said output chamber; control means for communicating a power supply to actuate said servomotor; expansible means driven by said primary fluid pressure signal for actuating said control means of said servomotor; a passage communicating said inlet with said follow-up chamber, said passage having a valve seat facing flow from said inlet, a valve poppet for engaging said valve seat, motor means actuated by said power supply to said control means and biasing said valve poppet against said seat when power is supplied to said control means, a second flow passage in said valve poppet for communicating said inlet to said follow-up chamber when said valve poppet abuts said valve seat, said second flow passage having an enlarged section with a ball member therein, said enlarged section having a valve seat surrounding the portion of said passage communicating with said follow-up chamber for abutment by said ball, said ball being normally held off of said valve seat, and said ball having a predetermined loose fit in said enlarged section so that a predetermined fluid flow therepast toward said follow-up chamber forces said ball against said seat.

6. Fluid pressure intensifying means having an inlet for receiving and intensifying a primary pulsating fluid pressure signal and comprising: a fluid pressure intensifying chamber having a movable wall therein dividing said fluid pressure intensifying chamber into an output chamber and a follow-up chamber, said movable wall having a normal position in said intensifying chamber; compensating means communicating said follow-up chamber to said output chamber and including check valve means for preventing flow from said output chamber to said follow-up chamber, said check valve means being open when said movable wall is in its normal position, a servomotor for moving said movable wall from said normal position to enlarge said follow-up chamber and force fluid out of said output chamber; control means for communicating a power supply to actuate said servomotor; expansible means driven by said primary fluid pressure signal for actuating said control means of said servomotor; a passage communicating said inlet with said follow-up chamber, said passage having a valve seat facing from said inlet, a valve poppet for engaging said valve seat, motor means actuated by said power supply to said control means and biasing said valve poppet against said seat when power is supplied to said control means, a second flow passage in said valve poppet for communicating said inlet to said follow-up chamber when said valve poppet abuts said valve seat, said second flow passage having an enlarged section with generally horizontal sidewalls and a ball member therein, said enlarged section having a valve seat surrounding the portion of said passage communicating with said follow-up chamber for abutment by said ball, said valve seat being positioned so that said ball member does not close off said valve seat when said ball is supported on said sidewalls, and said ball having a predetermined loose fit in said enlarged section so that a predetermined fluid flow therepast toward said follow-up chamber lifts said ball against said seat.

References Cited in the file of this patent

UNITED STATES PATENTS

| | | |
|---|---|---|
| 2,929,363 | Stelzer | Mar. 22, 1960 |
| 2,935,164 | Martin et al. | May 3, 1960 |
| 2,952,978 | Stelzer | Sept. 20, 1960 |